US010556294B2

(12) United States Patent
Whims

(10) Patent No.: US 10,556,294 B2
(45) Date of Patent: Feb. 11, 2020

(54) METHOD OF TREATING SUPERALLOY ARTICLES

(71) Applicant: GENERAL ELECTRIC COMPANY, Schenectady, NY (US)

(72) Inventor: Lawrence James Whims, Easley, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 303 days.

(21) Appl. No.: 15/615,001

(22) Filed: Jun. 6, 2017

(65) Prior Publication Data

US 2018/0345415 A1    Dec. 6, 2018

(51) Int. Cl.

| | | |
|---|---|---|
| *C22C 19/05* | (2006.01) | |
| *B23K 26/36* | (2014.01) | |
| *F01D 5/00* | (2006.01) | |
| *B23K 1/20* | (2006.01) | |
| *C23C 24/08* | (2006.01) | |
| *B23K 35/28* | (2006.01) | |
| *B23K 35/30* | (2006.01) | |
| *B23K 35/36* | (2006.01) | |
| *B23P 6/00* | (2006.01) | |
| *B23P 6/04* | (2006.01) | |
| *C22C 14/00* | (2006.01) | |
| *C22C 38/00* | (2006.01) | |
| *C22C 19/07* | (2006.01) | |
| *C22C 21/02* | (2006.01) | |
| *C22C 21/08* | (2006.01) | |

(52) U.S. Cl.
CPC .............. *B23K 26/36* (2013.01); *B23K 1/206* (2013.01); *B23K 35/286* (2013.01); *B23K 35/3033* (2013.01); *B23K 35/3605* (2013.01); *B23P 6/007* (2013.01); *B23P 6/045* (2013.01); *C22C 14/00* (2013.01); *C22C 19/05* (2013.01); *C22C 19/055* (2013.01); *C22C 19/056* (2013.01); *C22C 19/057* (2013.01); *C22C 19/058* (2013.01); *C22C 19/07* (2013.01); *C22C 21/02* (2013.01); *C22C 21/08* (2013.01); *C22C 38/00* (2013.01); *C23C 24/085* (2013.01); *F01D 5/005* (2013.01); *F05D 2230/232* (2013.01); *F05D 2230/237* (2013.01); *F05D 2230/31* (2013.01); *F05D 2230/41* (2013.01); *F05D 2230/80* (2013.01); *F05D 2230/90* (2013.01); *F05D 2300/175* (2013.01)

(58) Field of Classification Search
CPC ........ B23K 26/36; B23K 1/206; B23K 1/203; B23K 35/286; B23K 35/3033; B23K 35/3605; C23C 24/085; C22C 19/053; C22C 19/055; C22C 19/056; C22C 19/057; C22F 1/10
See application file for complete search history.

(56) References Cited

U.S. PATENT DOCUMENTS

| | | |
|---|---|---|
| 4,285,459 A | 8/1981 | Baladjanian et al. |
| 6,364,971 B1 | 4/2002 | Peterson, Jr. et al. |
| 6,491,207 B1 | 12/2002 | Smashey et al. |
| 6,884,964 B2 | 4/2005 | Murphy |
| 7,416,108 B2 | 8/2008 | Philip |
| 8,205,334 B2 | 6/2012 | Leibfried et al. |
| 8,618,440 B2 | 12/2013 | Allen et al. |
| 8,866,042 B2 | 10/2014 | Arjakine et al. |
| 2009/0297701 A1 | 12/2009 | Jabado et al. |
| 2014/0044939 A1 | 2/2014 | Hunt et al. |

FOREIGN PATENT DOCUMENTS

| | | |
|---|---|---|
| EP | 1 783 237 A2 | 5/2007 |
| EP | 1844888 A1 | 10/2007 |
| EP | 2 672 060 A2 | 12/2013 |
| EP | 3 159 425 A1 | 4/2017 |

OTHER PUBLICATIONS

Partial European Search Report and Opinion issued in connection with corresponding EP Application No. 18174599.3 dated Jul. 25, 2018.
Extended European Search Report and Opinion issued in connection with corresponding EP Application No. 18174599.3 dated Oct. 30, 2018.

*Primary Examiner* — Jessee R Roe
(74) *Attorney, Agent, or Firm* — McNees Wallace & Nurick LLC

(57) ABSTRACT

A method of treating a superalloy article, including selecting an article having a superalloy composition, whereby the article has a treatable feature on its surface. The method further includes removing a base alloy from a region abutting a first portion of the treatable feature. The method further includes treating a second portion of the treatable feature with a treatment composition to remove surface oxides. The method further includes inserting a treatment material into the first portion of the treatable feature followed by depositing the base alloy in the first portion of the treatable feature. The method further includes heat treating the article at a temperature above the melting point of the treatment material whereby the treatment material flows into the second portion of the treatable feature forming a treated article.

39 Claims, 10 Drawing Sheets

METHOD OF TREATING SUPERALLOY ARTICLES

FIELD OF THE INVENTION

The present invention is directed to a method of treating superalloy articles. More particularly, the invention is directed to the repair of surface cracks in structural alloy parts.

BACKGROUND OF THE INVENTION

Superalloy components, are frequently utilized in extreme environments where they are exposed to a variety of environmentally related damage and wear mechanisms, including: erosion due to impact by high velocity and high temperature airborne particles, high temperature oxidizing and corrosive gases, low-cycle fatigue processes and mechanical abrasion caused by rubbing against other members. The repeated stresses caused by these mechanisms are known to cause cracking and other damage to the components. Because the manufacturing costs for superalloy components are typically relatively high, it is often desirable to repair a damaged or worn component rather than replace it.

Various superalloy materials, such as stainless steels, cobalt base, and nickel base superalloys, used in land-based and aerospace turbine blades and vanes, require special methods to prepare the surface prior to brazing. Conventional processes such as vacuum cleaning, and hydrogen partial pressure cleaning are effective for a wide range of stainless steels, cobalt- and nickel-base alloys. However, vacuum cleaning, and hydrogen partial pressure cleaning are not very effective on alloys containing significant amounts of aluminum and titanium. Nickel based superalloys containing high concentrations of titanium and/or aluminum are very difficult to clean using conventional processes. Titanium and aluminum can oxidize to form complex spinels that penetrate deeply into any existing cracks.

BRIEF DESCRIPTION OF THE INVENTION

An exemplary embodiment includes, a method of treating a superalloy article. The method includes selecting an article having a superalloy composition, whereby said article has at least one treatable feature on its outermost surface. A base alloy is removed from a region abutting a portion of the at least one treatable feature to form a first treatment region and a second treatment region, wherein the base alloy has not been removed from a region abutting the second treatment region. A treatment composition including a silicon aluminum alloy or an aluminum fluoride derivative is inserted into at least a portion of the second treatment region to form a clean second treatment region. A treatment material is inserted into the first treatment region followed by depositing the base alloy into the first treatment region. The method additionally includes heating the article to a temperature above the melting point of the treatment material thereby allowing the molten treatment material to flow into the clean second treatment region to form a treated article.

Another exemplary embodiment includes, a method of treating a superalloy article. The method includes selecting an article having a superalloy composition, whereby said article has at least one treatable feature on its outermost surface. A base alloy is removed from a region abutting a portion of the at least one treatable feature to form a first treatment region and a second treatment region, wherein the base alloy has not been removed from a region abutting the second treatment region. The base alloy is removed from a region abutting a portion of the second treatment region to form a modified second treatment region. A treatment material is inserted into the first treatment region followed by depositing the base alloy into the first treatment region. The method additionally includes heating the article to a temperature above the melting point of the treatment material thereby allowing the molten treatment material to flow into the clean second treatment region to form a treated article.

Other features and advantages of the present invention will be apparent from the following more detailed description, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
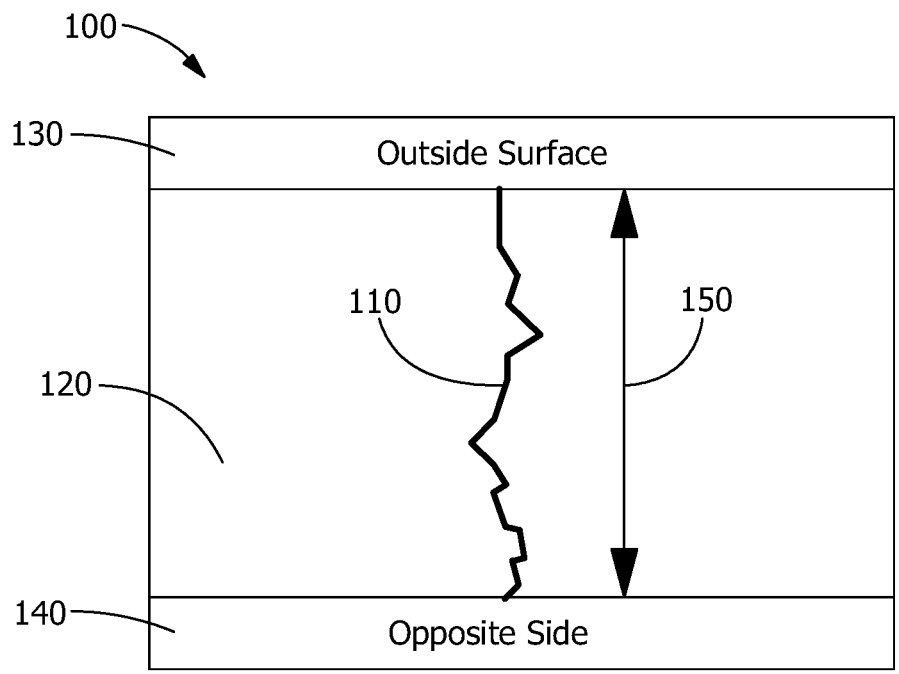
FIG. 1 is a side view of a superalloy article according to an embodiment.

Provided is a method of repairing cracks or other defects in a superalloy component. Embodiments of the present disclosure, for example, in comparison to the concepts failing to include one or more features disclosed herein, result in the capability to repair deep, broad, and/or highly oxidized cracks or other defects in a superalloy component.

As used herein, an "HTW alloy" is an alloy which exhibits liquation, hot and strain-age cracking.

As used herein, "Astroloy" refers to an alloy including a composition, by weight, of about 15% chromium, about 15% cobalt, about 5.25% molybdenum, about 3.5% titanium, about 4.4% aluminum, less than about 0.30% iron, about 0.06% carbon, about 0.03% boron, about 0.06% zirconium, and a balance of nickel.

As used herein, "AF2-IDA6" refers to an alloy including a composition, by weight, of about 12% chromium, about 10% cobalt, about 2.7% molybdenum, about 2.8% titanium, about 6.5% tungsten, about 4% aluminum, about 0.04% carbon, about 0.015% boron, about 0.10% zirconium, and a balance of nickel.

As used herein, "B1900" refers to an alloy including a composition, by weight, of about 8% chromium, about 10% cobalt, about 6% molybdenum, about 1% titanium, about 6% aluminum, about 4% tantalum, about 0.1% carbon, about 0.015% boron, about 0.10% zirconium, and a balance of nickel.

As used herein, "BNi-2" refers to an alloy including a composition, by weight, of about 3% iron, about 3.1% boron, about 4.5% silicon, about 7% chromium, and a balance of nickel.

As used herein, "BNi-3" refers to an alloy including a composition, by weight, of about 4.5% silicon, about 3% boron, and a balance of nickel.

As used herein, "BNi-5" refers to an alloy including a composition, by weight, of about 10% silicon, about 19% chromium, and a balance of nickel.

As used herein, "BNi-6" refers to an alloy including a composition, by weight, of about 11% phosphorous and a balance of nickel.

As used herein, "BNi-7" refers to an alloy including a composition, by weight, of about 14% chromium, about 10% phosphorous, and a balance of nickel.

As used herein, "BNi-9" refers to an alloy including a composition, by weight, of about 15% chromium, about 3% boron, and a balance of nickel.

As used herein, "BNi-10" refers to an alloy including a composition, by weight, of about 11.5% chromium, about 3.5% silicon, about 2.5% boron, about 3.5% iron, about 0.5% carbon, about 16% tungsten, and a balance of nickel.

As used herein, "CMSX-4" refers to an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel.

As used herein, "CMSX-10" refers to an alloy including a composition, by weight, of about 2% chromium, about 3% cobalt, about 0.4% molybdenum, about 5% tungsten, about 5.7% aluminum, about 0.2% titanium, about 8% tantalum, about 6% rhenium, and a balance of nickel.

As used herein, "DF-4B" refers to an alloy including a composition, by weight, of about 14% chromium, about 10% cobalt, about 3.5% aluminum, about 2.5% tantalum, about 2.75% boron, about 0.05% yttrium, and a balance of nickel.

As used herein, "D15" refers to an alloy including a composition, by weight, of about 15% chromium, about 10.25% cobalt, about 3.5% tantalum, about 3.5% aluminum, about 2.3% boron, and a balance of nickel.

As used herein, "DS Siemet" refers to an alloy including a composition, by weight, of about 9% cobalt, about 12.1% chromium, about 3.6% aluminum, about 4% titanium, about 5.2% tantalum, about 3.7% tungsten, about 1.8% molybdenum, and a balance of nickel.

As used herein, "GMR 235" refers to an alloy including a composition, by weight, of about 15.5% chromium, about 2.0% titanium, about 10.0% iron, about 3.0% aluminum, about 5.25% molybdenum, about 0.15% carbon, about 0.30% silicon, about 0.13% manganese, about 0.06% boron, and a balance of nickel.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel.

As used herein, "GTD 222" refers to an alloy including a composition, by weight, of about 23.5% chromium, about 19% cobalt, about 2% tungsten, about 0.8% niobium, about 2.3% titanium, about 1.2% aluminum, about 1% tantalum, about 0.25% silicon, about 0.1% manganese, and a balance of nickel.

As used herein, "GTD 262" refers to an alloy including a composition, by weight, of about 22.5% chromium, about 19% cobalt, about 2% tungsten, about 1.35% niobium, about 2.3% titanium, about 1.7% aluminum, about 0.1% carbon, and a balance of nickel.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel.

As used herein, "HAYNES 188" refers to an alloy including a composition, by weight, of about 22% chromium, about 22% nickel, about 0.1% carbon, about 3% iron, about 1.25% manganese, about 0.35% silicon, about 14% tungsten, about 0.03% lanthanum, and a balance of cobalt.

As used herein, "HAYNES 230" refers to an alloy including a composition, by weight, of about 22% chromium, about 2% molybdenum, about 0.5% manganese, about 0.4% silicon, about 14% tungsten, about 0.3% aluminum, about 0.1% carbon, about 0.02% lanthanum, and a balance of nickel.

As used herein, "INCONEL 100" refers to an alloy including a composition, by weight, of about 10% chromium, about 15% cobalt, about 3% molybdenum, about 4.7% titanium, about 5.5% aluminum, about 0.18% carbon, and a balance of nickel.

As used herein, "INCONEL 700" refers to an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel.

As used herein, "INCONEL 738" refers to an alloy including a composition, by weight, of about 0.17% carbon, about 16% chromium, about 8.5% cobalt, about 1.75% molybdenum, about 2.6% tungsten, about 3.4% titanium, about 3.4% aluminum, about 0.1% zirconium, about 2% niobium, and a balance of nickel.

As used herein, "INCONEL 738LC" refers to an alloy including a composition, by weight, of about 12% chromium, about 4.3% molybdenum, about 0.7% titanium, about 5.8% aluminum, about 0.06% carbon, about 0.007% boron, about 0.06% zirconium, and a balance of nickel.

As used herein, "INCONEL 792" refers to an alloy including a composition, by weight, of about 12.4% chromium, about 9% cobalt, about 1.9% molybdenum, about 3.8% tungsten, about 3.9% tantalum, about 3.1% aluminum, about 4.5% titanium, about 0.12% carbon, about 0.1% zirconium, and a balance of nickel.

As used herein, "INCONEL 939" refers to an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel.

As used herein, "L605" refers to an alloy including a composition, by weight, of about 20% chromium, about 10% nickel, about 15% tungsten, about 0.1% carbon, and a balance of cobalt.

As used herein, "Mar-M-200" refers to an alloy including a composition, by weight, of about 9% chromium, about 10% cobalt, about 12.5% tungsten, about 1% columbium, about 5% aluminum, about 2% titanium, about 10.14% carbon, about 1.8% hafnium, and a balance of nickel.

As used herein, "MAR-M-247" refers to an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel.

As used herein, "MAR-M-509" refers to an alloy including a composition, by weight, of about 24% chromium, about 10% nickel, about 7% tungsten, about 3.5% tantalum, about 0.5% zirconium, about 0.6% carbon, and a balance of cobalt.

As used herein, "MAR-M-509B" refers to an alloy including a composition, by weight, of about 23.5% chromium, about 10% nickel, about 7% tungsten, about 3.5% tantalum, about 0.45% zirconium, about 2.9% boron, about 0.6% carbon, about 0.2% titanium, and a balance of cobalt.

As used herein, "MGA1400" refers to an alloy including a composition, by weight, of about 10% cobalt, about 14% chromium, about 4% aluminum, about 2.7% titanium, about 4.7% tantalum, about 4.3% tungsten, about 1.5% molybdenum, about 0.1% carbon, and a balance of nickel.

As used herein, "MGA2400" refers to an alloy including a composition, by weight, of about 19% cobalt, about 19% chromium, about 1.9% aluminum, about 3.7% titanium, about 1.4% tantalum, about 6% tungsten, about 1% niobium, about 0.1% carbon, and a balance of nickel.

As used herein, "PMA 1480" refers to an alloy including a composition, by weight, of about 10% chromium, about 5% cobalt, about 5% aluminum, about 1.5% titanium, about 12% tantalum, about 4% tungsten, and a balance of nickel.

As used herein, "PWA 1483" refers to an alloy including a composition, by weight, of about 9% cobalt, about 12.2% chromium, about 3.6% aluminum, about 4.1% titanium, about 5% tantalum, about 3.8% tungsten, about 1.9% molybdenum, and a balance of nickel.

As used herein, "PMA 1484" refers to an alloy including a composition, by weight, of about 5% chromium, about 10% cobalt, about 2% molybdenum, about 5.6% aluminum, about 9% tantalum, about 6% tungsten, and a balance of nickel.

As used herein, "René 65" refers to an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel.

As used herein, "René 77 (Udimet 700)" refers to an alloy including a composition, by weight, of about 15% chromium, about 17% cobalt, about 5.3% molybdenum, about 3.35% titanium, about 4.2% aluminum, and a balance of nickel.

As used herein, "René 80" refers to an alloy including a composition, by weight, of about 14% chromium, about 9.5% cobalt, about 4% molybdenum, about 3% aluminum, about 5% titanium, about 4% tungsten, about 0.17% carbon, and a balance of nickel.

As used herein, "René 88DT" refers to an alloy including a composition, by weight, of about 16% chromium, about 13% cobalt, about 4% molybdenum, about 0.7% niobium, about 2.1% aluminum, about 3.7% titanium, about 4% tungsten, about 0.1% rhenium, a maximum of about 4.3% rhenium and tungsten, and a balance of nickel.

As used herein, "René 104" refers to an alloy including a composition, by weight, of about 13.1% chromium, about 18.2% cobalt, about 3.8% molybdenum, about 1.9% tungsten, about 1.4% niobium, about 3.5% aluminum, about 3.5% titanium, about 2.7% tantalum, and a balance of nickel.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel.

As used herein, "René 125" refers to an alloy including a composition, by weight, of about 8.5% chromium, about 10% cobalt, about 4.8% aluminum, up to about 2.5% titanium, about 8% tungsten, up to about 2% molybdenum, about 3.8% tantalum, about 1.4% hafnium, about 0.11% carbon, and a balance of nickel.

As used herein, "René 142" refers to an alloy including a composition, by weight, of about 6.8% chromium, about 12% cobalt, about 6.1% aluminum, about 4.9% tungsten, about 1.5% molybdenum, about 2.8% rhenium, about 6.4% tantalum, about 1.5% hafnium, and a balance of nickel.

As used herein, "René 195" refers to an alloy including a composition, by weight, of about 7.6% chromium, about 3.1% cobalt, about 7.8% aluminum, about 5.5% tantalum, about 0.1% molybdenum, about 3.9% tungsten, about 1.7% rhenium, about 0.15% hafnium, and a balance of nickel.

As used herein, "René N2" refers to an alloy including a composition, by weight, of about 7.5% cobalt, about 13% chromium, about 6.6% aluminum, about 5% tantalum, about 3.8% tungsten, about 1.6% rhenium, about 0.15% hafnium, and a balance of nickel.

As used herein, "René N4" refers to an alloy including a composition, by weight, of about 9.75% chromium, about 7.5% cobalt, about 4.2% aluminum, about 3.5% titanium, about 1.5% molybdenum, about 6.0% tungsten, about 4.8% tantalum, about 0.5% niobium, about 0.15% hafnium, and a balance of nickel.

As used herein, "René N5" refers to an alloy including a composition, by weight, of about 7.5% cobalt, about 7.0% chromium, about 6.5% tantalum, about 6.2% aluminum, about 5.0% tungsten, about 3.0% rhenium, about 1.5% molybdenum, about 0.15% hafnium, and a balance of nickel.

As used herein, "René N500" refers to an alloy including a composition, by weight, of about 7.5% cobalt, about 0.2% iron, about 6% chromium, about 6.25% aluminum, about 6.5% tantalum, about 6.25% tungsten, about 1.5% molybdenum, about 0.15% hafnium, and a balance of nickel.

As used herein, "René N515" refers to an alloy including a composition, by weight, of about 7.5% cobalt, about 0.2% iron, about 6% chromium, about 6.25% aluminum, about 6.5% tantalum, about 6.25% tungsten, about 2% molybdenum, about 0.1% niobium, about 1.5% rhenium, about 0.6% hafnium, and a balance of nickel.

As used herein, "René N6" refers to an alloy including a composition, by weight, of about 12.5% cobalt, about 4.2% chromium, about 7.2% tantalum, about 5.75% aluminum, about 6% tungsten, about 5.4% rhenium, about 1.4% molybdenum, about 0.15% hafnium, and a balance of nickel.

As used herein, "TMS-75" refers to an alloy including a composition, by weight, of about 3.5% chromium, about 12.5% cobalt, about 13.7% aluminum, about 2% tungsten, about 1.2% molybdenum, about 1.6% rhenium, about 2% tantalum, about 0.04% hafnium, and a balance of nickel.

As used herein, "TMS-82" refers to an alloy including a composition, by weight, of about 5.8% chromium, about 8.2% cobalt, about 12.2% aluminum, about 0.63% titanium, about 2.9% tungsten, about 1.2% molybdenum, about 0.8% rhenium, about 2.1% tantalum, about 0.04% hafnium, and a balance of nickel.

As used herein, "UDIMET 500" refers to an alloy including a composition, by weight, of about 18.5% chromium, about 18.5% cobalt, about 4% molybdenum, about 3% titanium, about 3% aluminum, and a balance of nickel.

As used herein, "UDIMET 600" refers to an alloy including a composition, by weight, of about 17.5% chromium, about 16.5% cobalt, about 4% molybdenum, about 2.9% titanium, about 4% iron, about 4.2% aluminum, and a balance of nickel.

As used herein, "UDIMET 700" refers to an alloy including a composition, by weight, of about 15.1% chromium, about 18.5% cobalt, about 5% molybdenum, about 3.4% titanium, about 4.3% aluminum, about 0.03% boron, about 0.07% carbon, less than about 1% iron, and a balance of nickel.

As used herein, "UNITEMP 1753" refers to an alloy including a composition, by weight, of about 16.25% chromium, about 7.2% cobalt, about 3.2% titanium, about 1.9% aluminum, about 0.03% boron, about 0.24% carbon, about 9.5% iron, about 0.05% manganese, about 0.1% silicon, about 8.4% tungsten, about 0.06% zirconium, about 0.008% boron, and a balance of nickel.

The present invention includes methods to treat various features on the outer surfaces of superalloy articles. The methods include cleaning, welding, brazing, and cold spray deposition of the superalloy article. The method described herein may be used on a wide variety of articles. In some embodiments, the method may be used to repair surface cracks and/or defects on articles having a hollow interior and openings or passages communicating with the hollow interior, such as turbine blade. An embodiment of a superalloy article 100 having at least one treatable feature 110 is shown in FIG. 1.

In the example of FIG. 1, the superalloy article 100 includes a base alloy 120 having a first surface 130, a second surface 140 opposed to the first surface 130, and at least one treatable feature 110 extending from the first surface 130 a depth 150 in the direction of the second surface 140. The base alloy 120 may include an aluminum superalloy (e.g., Ti-6Al-4V, Ti—Al, Al—Si-10 Mg), a nickel superalloy (e.g., AF2-1DA6, Astroloy, B1900, CMSX-4, GTD 111, GMR 235, Inconel 100, Inconel 700, Inconel 713C, Inconel 738, Inconel 738LC, Inconel 939, MAR-M-200, MAR-M-247, René 108, René N5, Udimet 500, Udimet 600, Udimet 700, Unitemp 1753), and combinations thereof. In some embodiments, the treatable feature 110 may extend a portion of a distance from the first surface 130 to the second surface 140. In some embodiments, the depth 150 of the treatable feature 110 may extend the entire distance from the first surface 130 to the second surface 140. In some embodiments, the at least one treatable feature 110 may include a crack or other defect.

Various material components of superalloys (e.g., titanium and/or aluminum) readily form oxides in the extreme environments typically encountered during use. These oxides may be present on the surface of the treatable feature 110. Metal oxides may reduce the ability to apply one or treatment techniques (e.g., welding, brazing, and/or activated diffusion healing (ADH)) to the treatable feature 110.

Figure 2:
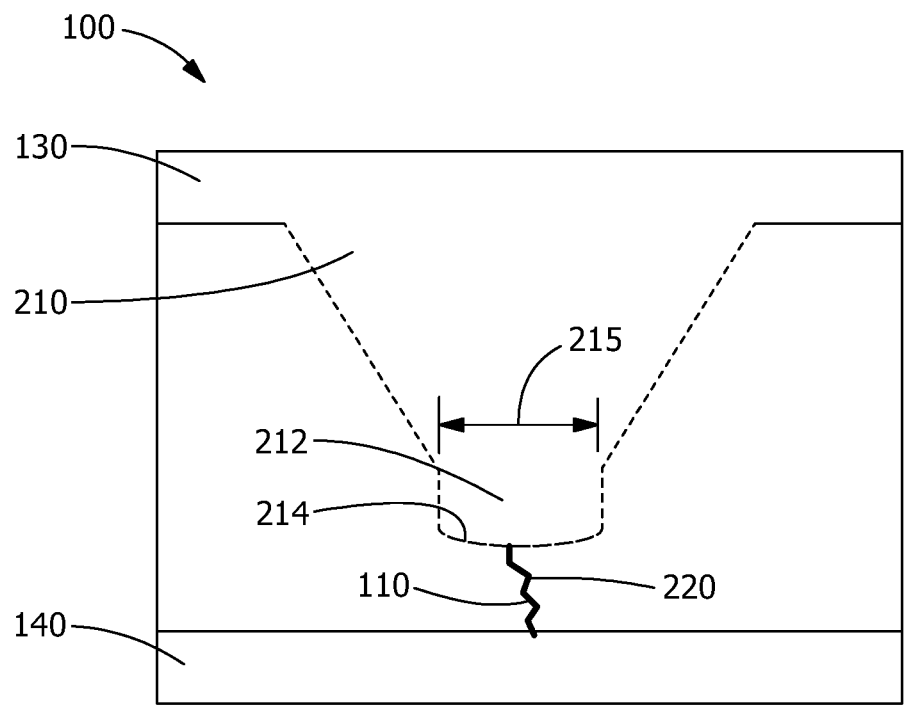
FIG. 2 is a side view of a superalloy article according to an embodiment.

In the example of FIG. 1, a portion of the base alloy 120 abutting the treatable feature 110 may be removed to form a first treatment region 210 as shown in FIG. 2. The removal of the base alloy 120 may also remove substantially all the metal oxides present on the surface within the first treatment region 210. In some embodiments, the first treatment region 210 may taper from the first surface 130 toward the second surface 140. In some embodiments, the first treatment region 210 may further include a channel region 212. The channel region 212 may include a rounded or flat base 214 abutting the remaining treatable feature 110. In some embodiments, the channel region 212 includes a substantially uniform width 215. The remaining treatable feature 110 constitutes a second treatment region 220. In some embodiments, the first treatment region 210 may extend at least 75 percent, at least 80 percent, at least 85 percent, less than 95 percent, less than 90 percent, less than 85 percent, and combinations thereof, of the depth 150 of the treatable feature 110.

Figure 3:
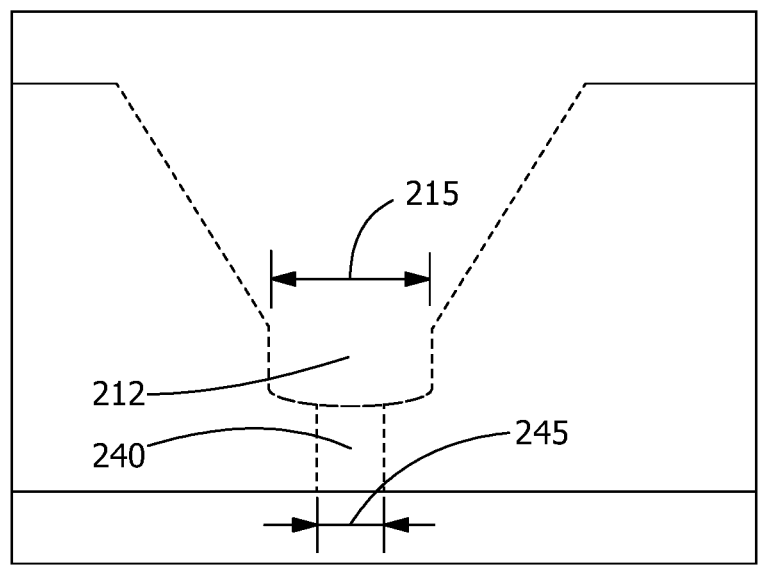
FIG. 3 is a side view of a superalloy article according to an embodiment.

In some embodiments, a portion of the base alloy 120 abutting the second treatment region 220 may be removed to form a modified second treatment region 240 as shown in FIG. 3. The removal of the base alloy 120 may also remove substantially all the metal oxides present on the surface within the second treatment region 220. In some embodiments, the modified second treatment region 240 includes a substantially uniform width 245. In some embodiments, the width 245 of the modified second treatment region 240 is less than the width 215 of the channel region 212.

The base alloy 120 may be any suitable alloy, including, but not limited to, an HTW alloy, a refractory alloy, a superalloy, a nickel-based superalloy, a cobalt-based superalloy, an iron-based superalloy, a titanium-aluminum superalloy, an iron-based alloy, a steel alloy, a stainless steel alloy, a cobalt-based alloy, a nickel-based alloy, a titanium-based alloy, GTD 111, GTD 444, HAYNES 188, HAYNES 230, INCONEL 738, L605, MAR-M-247, MAR-M-509, René 108, René 142, René 195, and René N2, or combinations thereof.

Techniques for removing the portion of the base alloy 120 include electrochemical machining, electrode discharge machining, mechanical grinding, and combinations thereof.

Figure 4:
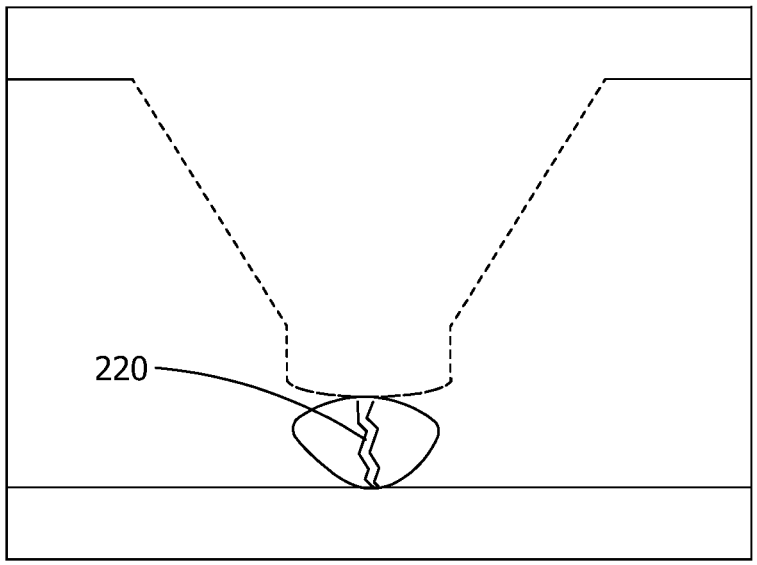
FIG. 4 is a side view of a superalloy article according to an embodiment.

Alternatively, the second treatment region 220 may be treated with a treatment composition capable of removing substantially all the metal oxides on the surface of the second treatment region 220 to form a clean second treatment region 220. In some embodiments, the treatment composition includes a material capable of generating a halogen ion. In some embodiments, the treatment composition includes a silicon aluminum alloy or an aluminum fluoride derivative. In an embodiment, the treatment composition includes potassium aluminum fluoride ($KAlF_4$). A superalloy article 100 including a clean second treatment region 220 is shown in FIG. 4.

Figure 5:
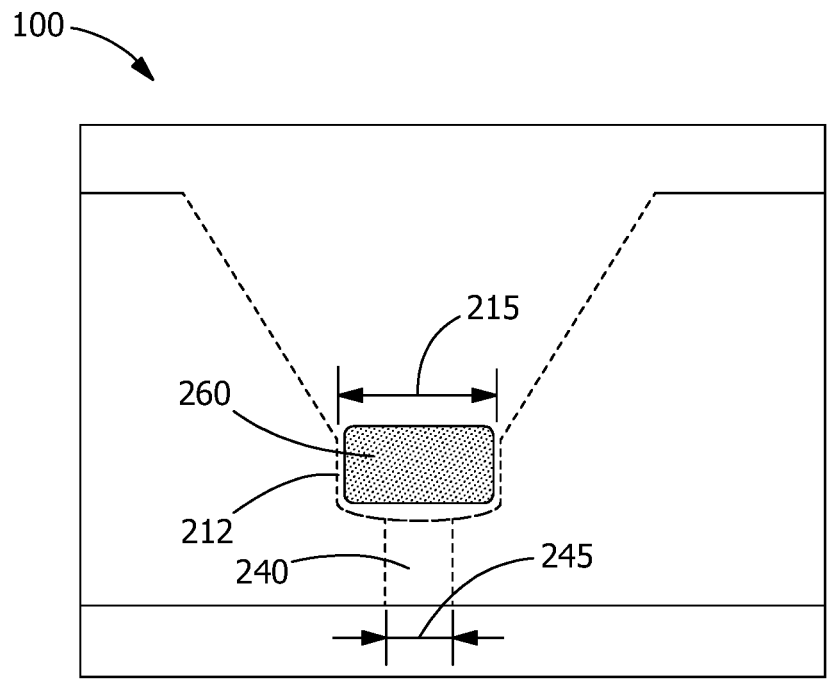
FIG. 5 is a side view of a superalloy article according to an embodiment.
Figure 6:
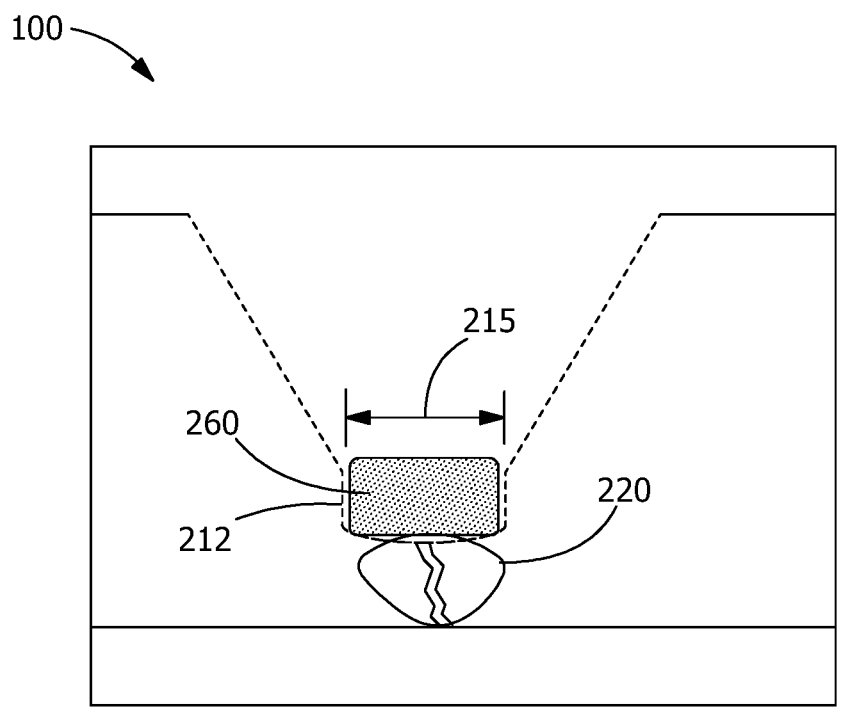
FIG. 6 is a side view of a superalloy article according to an embodiment.

A treatment material 260 may be (placed/deposited/positioned) within the first treatment region 210. In some embodiments, the treatment material 260 may be placed in the channel 212. In some embodiments, a dimension of the treatment material 260 is about the width 215 of the channel 212. An embodiment of the superalloy article 100 including the treatment material 260 is shown in FIG. 5. An alternative embodiment of the superalloy article 100 including the treatment material 260 is shown in FIG. 6.

The treatment material 260 may be selected from materials able to bond to the base alloy 120. The treatment material 260 typically has a melting point less than the melting point of the base alloy 120. In some embodiments, the treatment material 260 includes brazing alloys compatible with the base alloy 120. In some embodiments, the treatment material 260 includes a pre-sintered preform.

The treatment material 260 may be any suitable alloy, including, but not limited to, a braze alloy, an iron-based alloy, a steel alloy, a stainless steel alloy, a cobalt-based alloy, a nickel-based alloy, a titanium-based alloy, DF-4B, D15, MAR-M-509B, BNi-2, BNi-3, BNi-5, BNi-6, BNi-7, BNi-9, BNi-10, or combinations thereof.

Alternatively, a polymeric treatment composition 280 and the treatment material 260 may be (placed/deposited/positioned) within the first treatment region 210. In some embodiments, the polymeric treatment composition includes polytetrafluoroethylene (PTFE). In some embodiments, the polymeric treatment composition 280 and treatment material 260 may be placed in the channel 212. In some embodiments, a dimension of the polymeric treatment composition 280 and the treatment material 260 is about the width 215 of the channel 212. An embodiment of the superalloy article 100 including the polymeric treatment composition 280 and the treatment material 260 is shown in FIG. 7.

Figure 7:
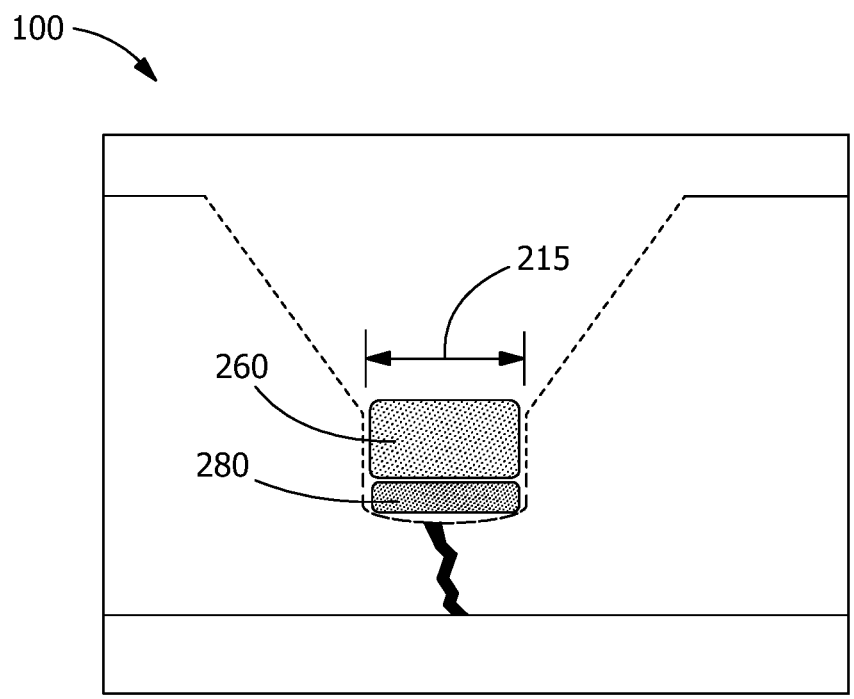
FIG. 7 is a side view of a superalloy article according to an embodiment.

In the examples of FIGS. 5, 6 and 7, a filler material 270 may be deposited in the first treatment region 210. The filler material 270 may be the same or different from the base alloy 120. In some embodiments, the filler material 270 may be selected to provide thermal and mechanical properties similar to the base alloy 120. In some embodiments, the filler material 270 is the same at the base alloy 120. In some embodiments, the filler material 270 may be deposited in an amount sufficient to at least fill the remaining volume of the first treatment region 210.

Figure 8:
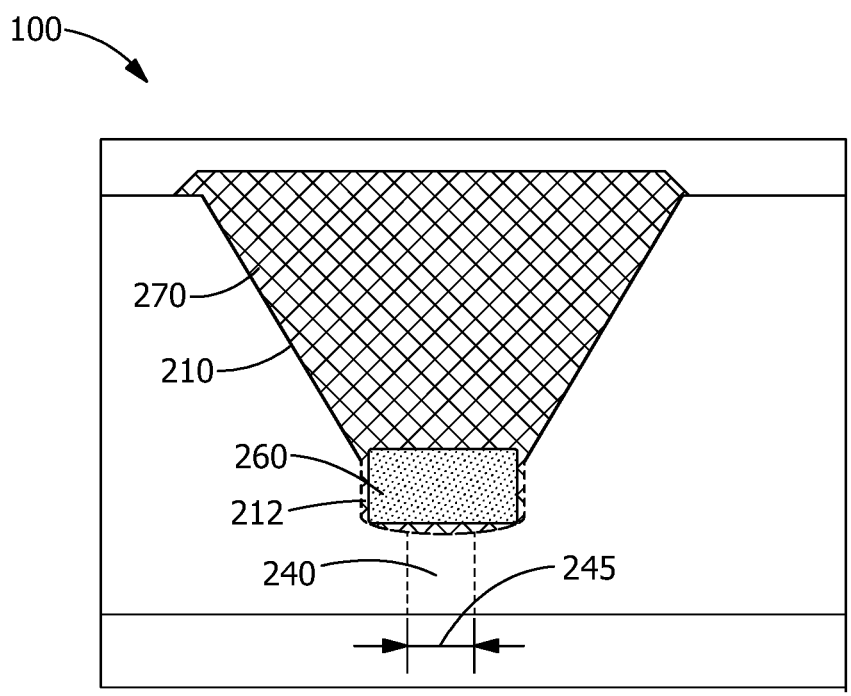
FIG. 8 is a side view of a superalloy article according to an embodiment.
Figure 9:
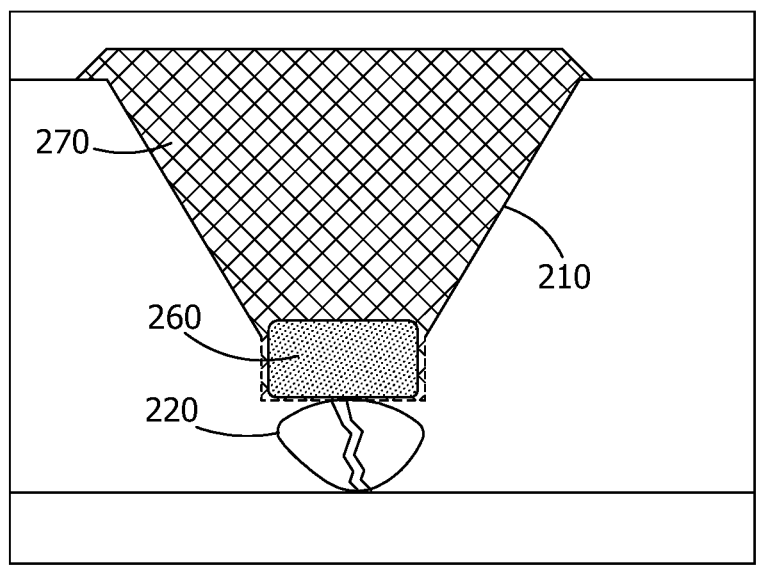
FIG. 9 is a side view of a superalloy article according to an embodiment.
Figure 10:
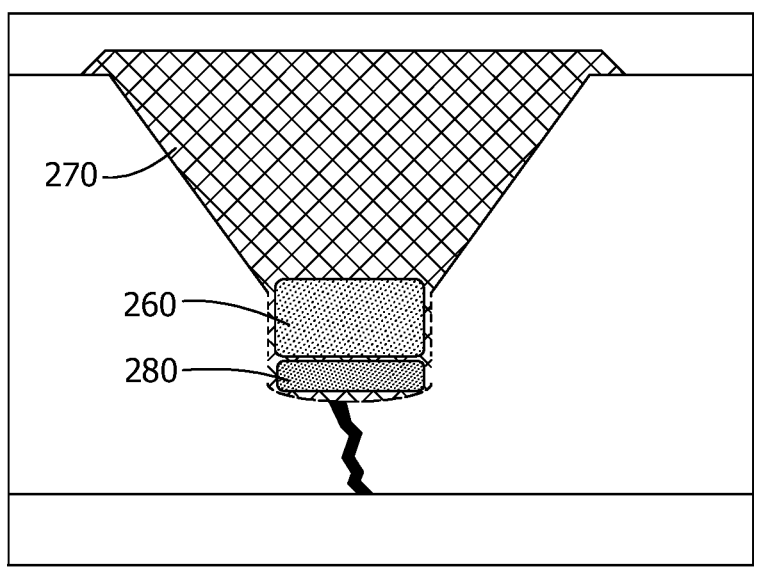
FIG. 10 is a side view of a superalloy article according to an embodiment.

Techniques for the deposition of the filler material 270 may result in the filler material 270 being bonded to the base alloy 120 and/or the treatment material 260. A filler material 270 bonded to both the base alloy 120 and treatment material 260 may result in the superalloy article 100 having more uniform thermal and mechanical properties. In some embodiments, the filler material 270 may be deposited by cold spray deposition. FIGS. 8, 9, and 10 illustrate the examples of FIGS. 5, 6, and 7 including the filler material 270.

Figure 11:
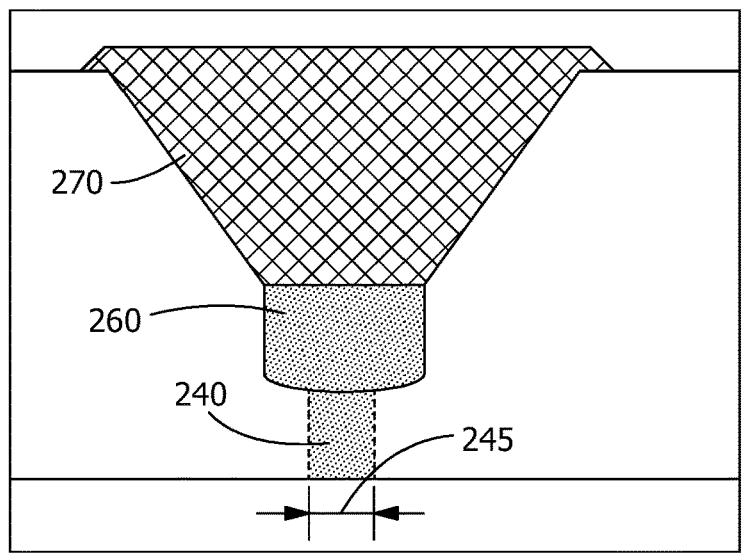
FIG. 11 is a side view of a superalloy article according to an embodiment.
Figure 12:
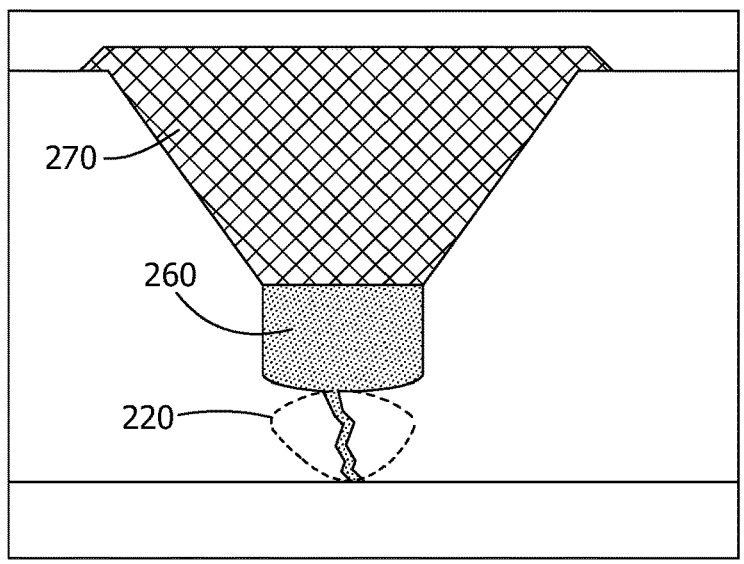
FIG. 12 is a side view of a superalloy article according to an embodiment.

In the examples of FIGS. 8, 9, and 10, the superalloy article 100 may be heat treated to form a treated superalloy article 100. In an embodiment, the heat treatment is performed at a temperature greater than the melting point of the treatment material 260 and less than the melting temperature of the filler material 270 and base alloy 120. During the heat treatment, the polymeric treatment composition 280, if present, dissociates releasing a fluorine containing gas (e.g., F2, HF) which of removes substantially all the metal oxides on the surface of the second treatment region 220 to form a clean second treatment region 220. During the heat treatment at least a portion of the treatment material 260 melts. The treatment material 260 may undergo volumetric expansion due to the increase in temperature. As the treatment material 260 expands, the molten treatment material 260 flows into the modified second treatment region 240 or cleaned second treatment region 220 at least partially due to hydrostatic pressure and/or capillary action. Upon cooling, the molten treatment material 260 solidifies to form a treated superalloy article 100. In some embodiments, the treatment material 260 fills at least 85 volume percent, at least 90 volume percent, at least 95 volume percent, at least 97 volume percent, at least 98 volume percent, at least 99 volume percent, and/or substantially all of the modified second treatment region 240. FIGS. 11 and 12 illustrate treated superalloy articles 100 resulting from the examples of FIGS. 8 and 9 and 10 respectively.

Figure 13:
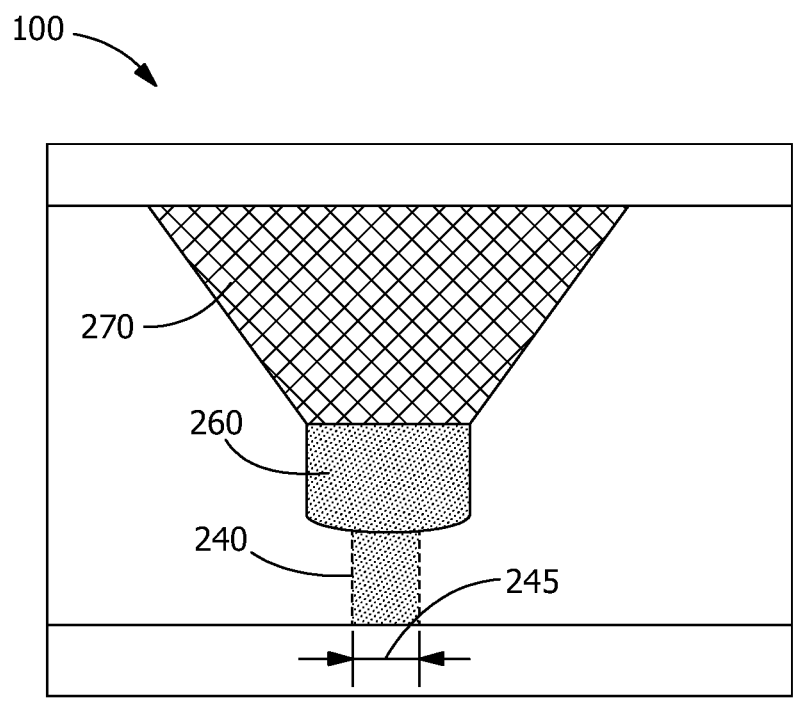
FIG. 13 is a side view of a superalloy article according to an embodiment.
Figure 14:
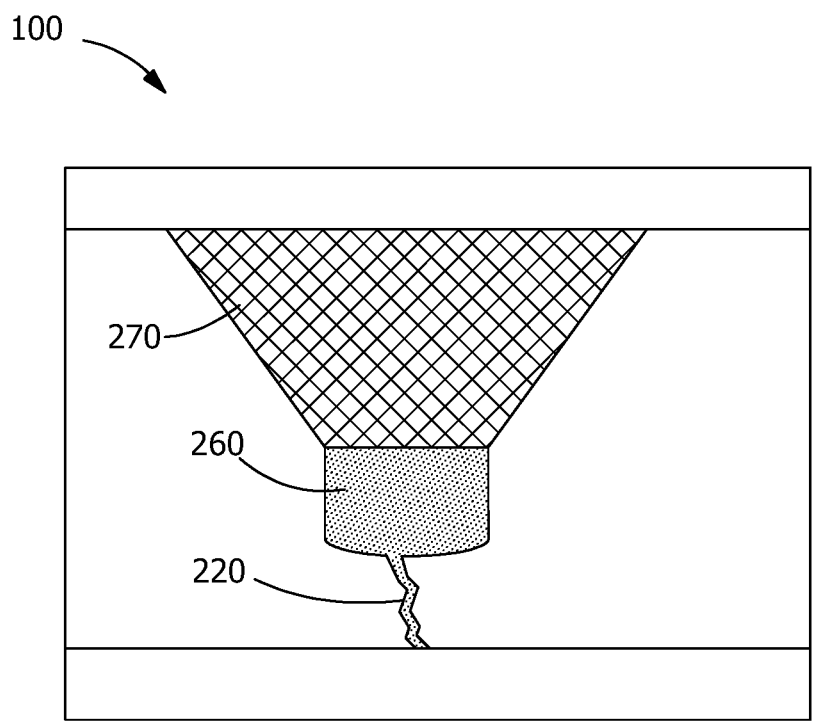
FIG. 14 is a side view of a superalloy article according to an embodiment.

In the examples of FIGS. 11 and 12, the treated superalloy articles 100 may undergo post treatment processing to contour the first surface 130 and/or the second surface 140 to a desired shape and/or texture. In some embodiments, the first surface 130 and/or the second surface 140 is processed to obtain the same contour as the original article. FIGS. 13 and 14 illustrate post treatment processed superalloy articles 100 resulting from the examples of FIGS. 11 and 12 respectively.

Figure 15:
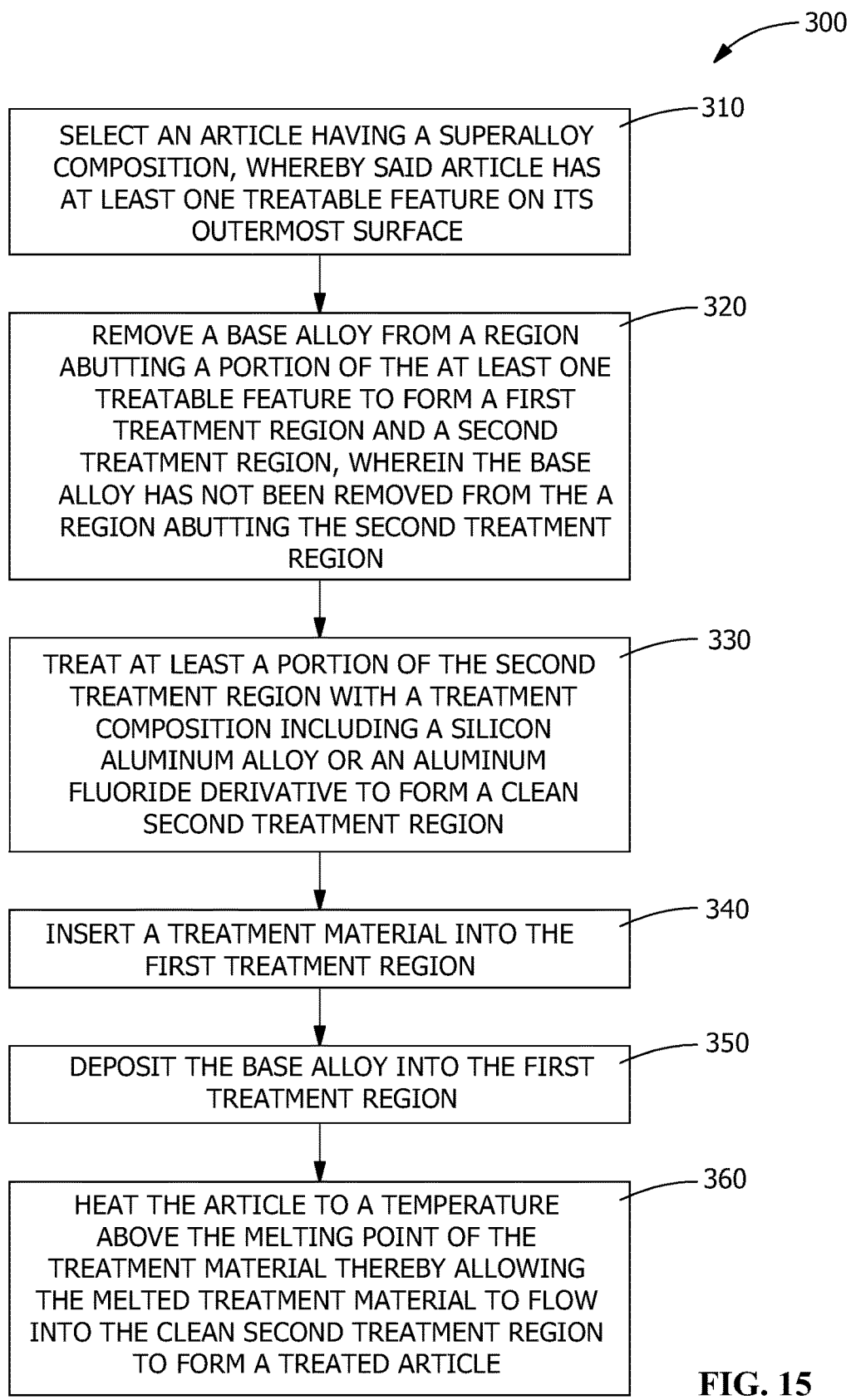
FIG. 15 is a flowchart of a method of treating a superalloy article according to an embodiment.

FIG. 15 is a flowchart of a method 300 of treating the superalloy article 100. In the example of FIG. 15, at block 310, select an article having a superalloy composition, whereby said article has at least one treatable feature on its outermost surface. At block 320, remove a base alloy from a region abutting a portion of the at least one treatable feature to form a first treatment region and a second treatment region, wherein the base alloy has not been removed from the a region abutting the second treatment region. At block 330, treat at least a portion of the second treatment region with a treatment composition including a silicon aluminum alloy or an aluminum fluoride derivative to form a clean second treatment region. At block 340, insert a treatment material into the first treatment region. At block 350, deposit the base alloy into the first treatment region. At block 360, heat the article to a temperature above the melting point of the treatment material thereby allowing the melted treatment material to flow into the clean second treatment region to form a treated article.

Figure 16:
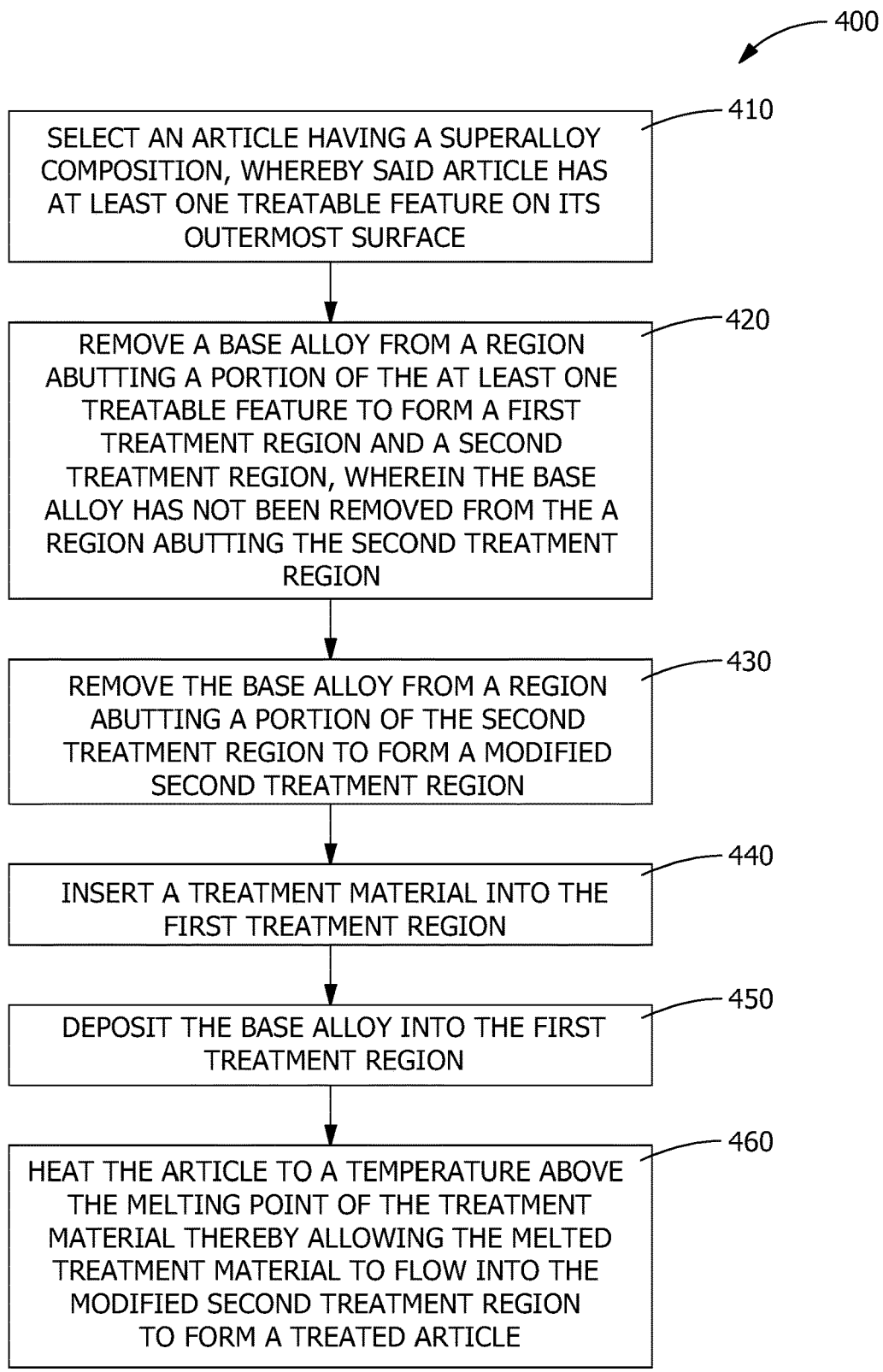
FIG. 16 is a flowchart of a method of treating a superalloy article according to an embodiment.

FIG. 16 is a flowchart of a method 400 of treating the superalloy article 100. In the example of FIG. 16, at block 410, select an article having a superalloy composition, whereby said article has at least one treatable feature on its outermost surface. At block 420, remove a base alloy from a region abutting a portion of the at least one treatable feature to form a first treatment region and a second treatment region, wherein the base alloy has not been removed from the a region abutting the second treatment region. At block 430, remove the base alloy from a region abutting a portion of the second treatment region to form a modified second treatment region. At block 440, insert a treatment material into the first treatment region. At block 450, deposit the base alloy into the first treatment region. At block 460, heat the article to a temperature above the melting point of the treatment material thereby allowing the melted treatment material to flow into the clean second treatment region to form a treated article.

Figure 17:
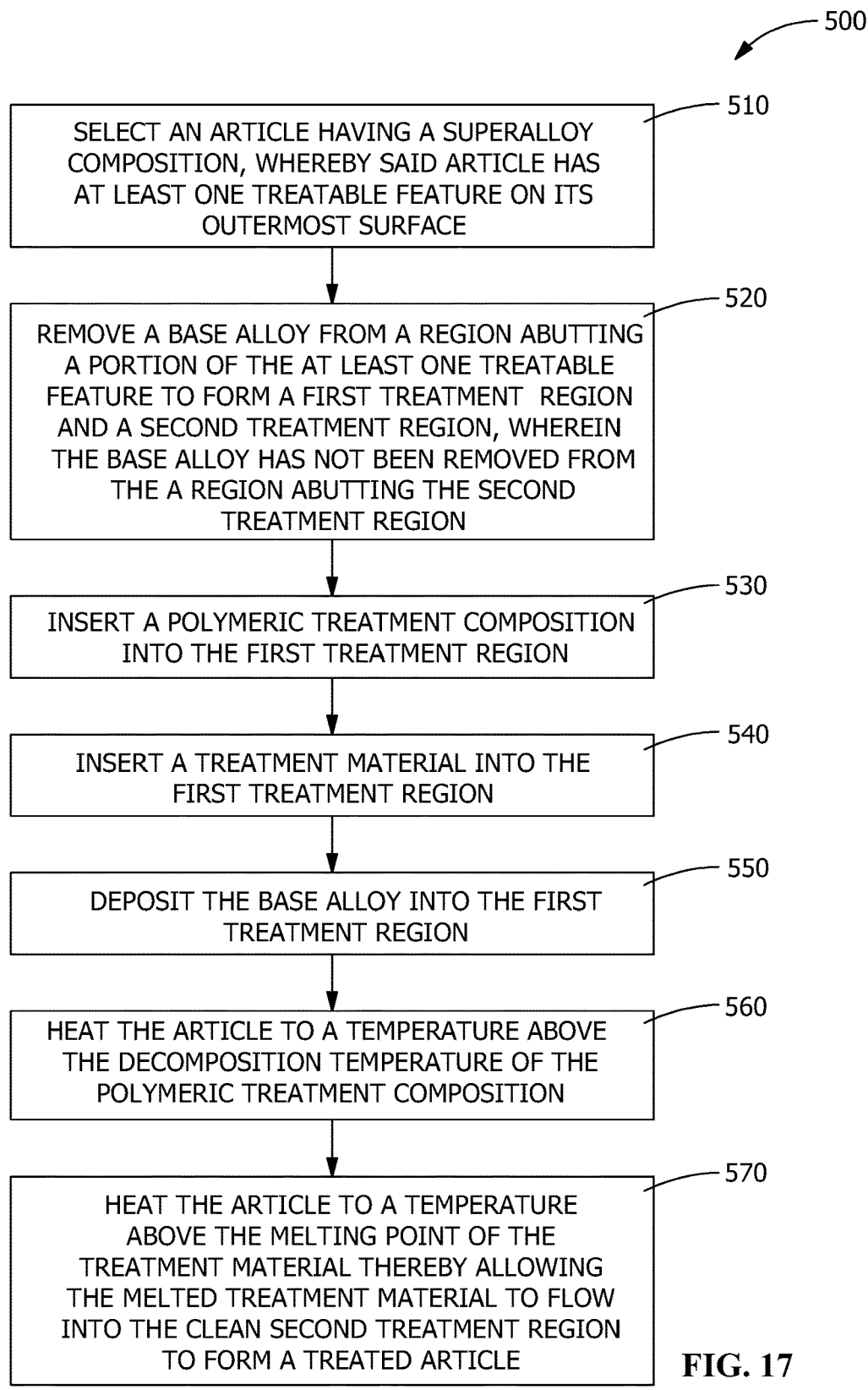
FIG. 17 is a flowchart of a method of treating a superalloy article according to an embodiment.

FIG. 17 is a flowchart of a method 500 of treating the superalloy article 100. In the example of FIG. 17, at block 510, select an article having a superalloy composition, whereby said article has at least one treatable feature on its outermost surface. At block 520, remove a base alloy from a region abutting a portion of the at least one treatable feature to form a first treatment region and a second treatment region, wherein the base alloy has not been removed from the a region abutting the second treatment region. At block 530, insert a polymeric treatment composition into the first treatment region. At block 540, insert a treatment material into the first treatment region. At block 550, deposit the base alloy into the first treatment region. At block 560, heat the article to a temperature above the decomposition temperature of the polymeric treatment composition. At block 570, heat the article to a temperature above the melting point of the treatment material thereby allowing the melted treatment material to flow into the clean second treatment region to form a treated article.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A method of treating a superalloy article, comprising:
   selecting an article having a superalloy composition, whereby said article has at least one treatable feature on its outermost surface;
   removing a base alloy from a region abutting a portion of the at least one treatable feature to form a first treatment region and a second treatment region, wherein the base alloy has not been removed from the region abutting the second treatment region;
   treating at least a portion of the second treatment region with a treatment composition including a silicon aluminum alloy or an aluminum fluoride derivative to form a clean second treatment region;
   inserting a treatment material into the first treatment region;
   depositing the base alloy into the first treatment region;
   heating the article to a temperature above the melting point of the treatment material thereby allowing the molten treatment material to flow into the clean second treatment region to form a treated article.

2. The method of claim 1, further comprising processing the treated article to form a contoured surface.

3. The method of claim 2, wherein the contoured surface corresponds to the article surface prior to the formation of the at least one treatable feature.

4. The method of claim 1, wherein the treatable feature includes a crack or defect.

5. The method of claim 1, wherein the treatable feature includes an opening to the atmosphere.

6. The method of claim 1, wherein the first treatment region extends into the treatable feature about 75 percent to about 95 percent of the depth of the treatable feature.

7. The method of claim 6, wherein the first treatment region includes a rounded or substantially flat zone.

8. The method of claim 1, wherein the aluminum fluoride derivative includes a potassium aluminum fluoride ($KAlF_4$).

9. The method of claim 1, wherein inserting the treatment composition removes substantially all the metal oxides from the contacted area.

10. The method of claim 1, wherein the temperature is below the melting point of the base alloy.

11. The method of claim 1, wherein depositing the base alloy includes depositing the base alloy by cold spray deposition.

12. The method of claim 1, wherein the molten treatment material flowing into the second treatment region is at least partially facilitated by hydraulic force or capillary action.

13. A superalloy article, treated by the method of claim 1.

14. A method of treating a superalloy article, comprising:
    selecting an article having a superalloy composition, whereby said article has at least one treatable feature on its outermost surface;
    removing a base alloy from a region abutting a portion of the at least one treatable feature to form a first treatment region, and wherein the base alloy has not been removed from a region abutting at least a portion of the treatable feature designated as a second treatment region;
    removing a base alloy from a region abutting a portion of the second treatment region to form a modified second treatment region;
    inserting a treatment material into the first treatment region;
    depositing the base alloy into the first treatment region;
    heating the article to a temperature above the melting point of the treatment material thereby allowing the molten treatment material to flow into the modified second treatment region to form a treated article;
    wherein the molten treatment material flowing into the second treatment region is at least partially facilitated by hydraulic force or capillary action.

15. The method of claim 13, further comprising processing the treated article to form a contoured surface.

16. The method of claim 14, wherein the contoured surface corresponds to the article surface prior to the formation of the at least one treatable feature.

17. The method of claim 14, wherein the treatable feature includes a crack or defect.

18. The method of claim 14, wherein the temperature is below the melting point of the base alloy.

19. The method of claim 14, wherein depositing the base alloy includes depositing the base alloy by cold spray deposition.

20. A method for treating a component, comprising:
    selecting an article having a superalloy composition, whereby said article has at least one treatable feature on its outermost surface;
    removing a base alloy from a region abutting a portion of the at least one treatable feature to form a first treatment region and a second treatment region, wherein the base alloy has not been removed from the region abutting the second treatment region;
    inserting a polymeric treatment composition including polytetrafluoroethylene into the first treatment region;
    inserting a treatment material into the first treatment region;
    depositing the base alloy into the first treatment region;
    heating the component to a temperature above the decomposition temperature of the polytetrafluoroethylene to form a clean second treatment region; and
    heating the component to a temperature above the melting point of the treatment material thereby allowing the molten treatment material to flow into the clean second treatment region to form a treated article.

21. The method of claim 20, further comprising processing the base alloy to form a surface contoured to the component.

22. The method of claim 21, wherein the processing is a technique selected from the group consisting of blending, grinding, machining, scraping, and combinations thereof.

23. The method of claim 20, wherein the component includes a superalloy.

24. The method of claim 20, wherein the component includes a turbine component.

25. The method of claim 20, wherein the pre-sintered preform includes at least one braze alloy.

26. The method of claim 20, wherein the depositing includes cold spray deposition.

27. The method of claim 20, wherein the temperatures are below the melting point of the base alloy.

28. The method of claim 20, wherein the treatment region extends into the treatable feature from about 75 percent to about 95 percent of the depth of the treatable feature.

29. The method of claim 20, wherein the component includes a material selected from the group consisting of an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel; a composition, by weight, of about 8% chromium, about 10% cobalt, about 6% molybdenum, about 1% titanium, about 6% aluminum, about 4% tantalum, about 0.1% carbon, about 0.015% boron, about 0.10% zirconium, and a balance of nickel; an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel; an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel; an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel; an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel; an alloy including a composition, by weight, of about 12% chromium, about 10% cobalt, about 2.7% molybdenum, about 2.8% titanium, about 6.5% tungsten, about 4% aluminum, about 0.04% carbon, about 0.015% boron, about 0.10% zirconium, and a balance of nickel; an alloy including a composition, by weight, of about 18.5% chromium, about 18.5% cobalt, about 4% molybdenum, about 3% titanium, about 3% aluminum, and a balance of nickel; an alloy including a composition, by weight, of about 17.5% chromium, about 16.5% cobalt, about 4% molybdenum, about 2.9% titanium, about 4% iron, about 4.2% aluminum, and a balance of nickel; an alloy including a composition, by weight, of about 15.1% chromium, about 18.5% cobalt, about 5% molybdenum, about 3.4% titanium, about 4.3% aluminum, about 0.03% boron, about 0.07% carbon, less than about 1% iron, and a balance of nickel; an alloy including a composition, by weight, of about 15% chromium, about 15% cobalt, about 5.25% molybdenum, about 3.5% titanium, about 4.4% aluminum, less than about 0.30% iron, about 0.06% carbon, about 0.03% boron, about 0.06% zirconium, and a balance of nickel; an alloy including a composition, by weight, of about 10% chromium, about 15% cobalt, about 3% molybdenum, about 4.7% titanium, about 5.5% aluminum, about 0.18% carbon, and a balance of nickel; an alloy including a composition, by weight, of about 12% chromium, about 4.3% molybdenum, about 0.7% titanium, about 5.8% aluminum, about 0.06% carbon, about 0.007% boron, about 0.06% zirconium, and a balance of nickel; an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel; an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel; an alloy including a composition, by weight, of about 15.5% chromium, about 2.0% titanium, about 10.0% iron, about 3.0% aluminum, about 5.25% molybdenum, about 0.15% carbon, about 0.30% silicon, about 0.13% manganese, about 0.06% boron, and a balance of nickel; an alloy including a composition, by weight, of about 16.25% chromium, about 7.2% cobalt, about 3.2% titanium, about 1.9% aluminum, about 0.03% boron, about 0.24% carbon, about 9.5% iron, about 0.05% manganese, about 0.1% silicon, about 8.4% tungsten, about 0.06% zirconium, about 0.008% boron, and a balance of nickel; and combinations thereof.

30. A component, treated by the method of claim 20.

31. The component of claim 30, wherein the base alloy is processed to form a surface contoured to the component.

32. The component of claim 31, wherein the processing is a technique selected from the group consisting of blending, grinding, machining, scraping, and combinations thereof.

33. The component of claim 30, wherein the component includes a superalloy.

34. The component of claim 30, wherein the component includes a turbine component.

35. The component of claim 30, wherein the pre-sintered preform includes at least one braze alloy.

36. The component of claim 30, wherein the depositing includes cold spray deposition.

37. The component of claim 30, wherein the temperatures are below the melting point of the base alloy.

38. The component of claim 30, wherein the treatment region extends into the treatable feature from about 75 percent to about 95 percent of the depth of the treatable feature.

39. The component of claim 30, wherein the component includes a material selected from the group consisting of an alloy including a composition, by weight, of about 13% cobalt, up to about 1.2% iron, about 16% chromium, about 2.1% aluminum, about 3.75% titanium, about 4% tungsten, about 4% molybdenum, about 0.7% niobium, up to about 0.15% manganese, and a balance of nickel; a composition, by weight, of about 8% chromium, about 10% cobalt, about 6% molybdenum, about 1% titanium, about 6% aluminum, about 4% tantalum, about 0.1% carbon, about 0.015% boron, about 0.10% zirconium, and a balance of nickel; an alloy including a composition, by weight, of about 6.4% chromium, about 9.6% cobalt, about 0.6% molybdenum, about 6.4% tungsten, about 5.6% aluminum, about 1.0% titanium, about 6.5% tantalum, about 3% rhenium, about 0.1% hafnium, and a balance of nickel; an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel; an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel; an alloy including a composition, by weight, of about 5.5% aluminum, about 0.15% carbon, about 8.25% chromium, about 10% cobalt, about 10% tungsten, about 0.7% molybdenum, about 0.5% iron, about 1% titanium, about 3% tantalum, about 1.5% hafnium, and a balance of nickel; an alloy including a composition, by weight, of about 12% chromium, about 10% cobalt, about 2.7% molybdenum, about 2.8% titanium, about 6.5% tungsten, about 4% aluminum, about 0.04% carbon, about 0.015% boron, about 0.10% zirconium, and a balance of nickel; an alloy including a composition, by weight, of about 18.5% chromium, about 18.5% cobalt, about 4% molybdenum, about 3% titanium, about 3% aluminum, and a balance of nickel; an alloy including a composition, by weight, of about 17.5% chromium, about 16.5% cobalt, about 4% molybdenum, about 2.9% titanium, about 4% iron, about 4.2% aluminum, and a balance of nickel; an alloy including a composition, by weight, of about 15.1% chromium, about 18.5% cobalt, about 5% molybdenum, about 3.4% titanium, about 4.3% aluminum, about 0.03% boron, about 0.07% carbon, less than about 1% iron, and a balance of nickel; an alloy including a composition, by weight, of about 15% chromium, about 15% cobalt, about 5.25% molybdenum, about 3.5% titanium, about 4.4% aluminum, less than about 0.30% iron, about 0.06% carbon, about 0.03% boron, about 0.06% zirconium, and a balance of nickel; an alloy including a composition, by weight, of about 10% chromium, about 15% cobalt, about 3% molybdenum, about 4.7% titanium, about 5.5% aluminum, about 0.18% carbon, and a balance of nickel; an alloy including a composition, by weight, of about 12% chromium, about 4.3% molybdenum, about 0.7% titanium, about 5.8% aluminum, about 0.06% carbon, about 0.007% boron, about 0.06% zirconium, and a balance of nickel; an alloy including a composition, by weight, of about 0.15% carbon, about 22.5% chromium, about 19% cobalt, about 2% tungsten, about 3.8% titanium, about 1.9% aluminum, about 1.4% tantalum, about 1% niobium, and a balance of nickel; an alloy including a composition, by weight, of up to about 0.12% carbon, about 15% chromium, about 28.5% cobalt, about 3.75% molybdenum, about 2.2% titanium, about 3% aluminum, about 0.7% iron, up to about 0.3% silicon, up to about 0.1% manganese, and a balance of nickel; an alloy including a composition, by weight, of about 15.5% chromium, about 2.0% titanium, about 10.0% iron, about 3.0% aluminum, about 5.25% molybdenum, about 0.15% carbon, about 0.30% silicon, about 0.13% manganese, about 0.06% boron, and a balance of nickel; an alloy including a composition, by weight, of about 16.25% chromium, about 7.2% cobalt, about 3.2% titanium, about 1.9% aluminum, about 0.03% boron, about 0.24% carbon, about 9.5% iron, about 0.05% manganese, about 0.1% silicon, about 8.4% tungsten, about 0.06% zirconium, about 0.008% boron, and a balance of nickel; and combinations thereof.

* * * * *